Nov. 8, 1927.  1,648,163
G. G. CHILDS
LUBRICATOR
Filed April 13, 1923
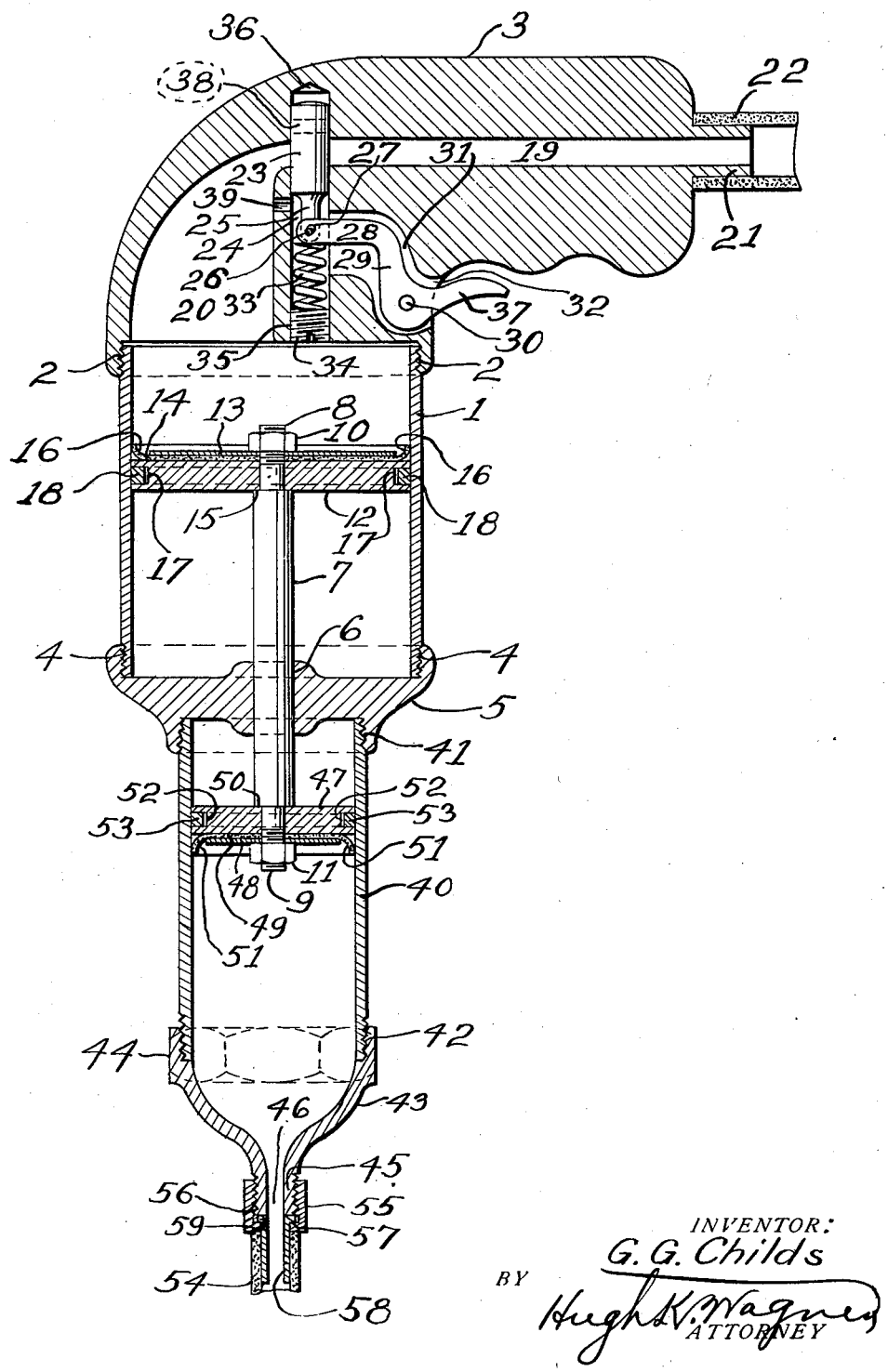
INVENTOR:
G. G. Childs
BY
Hugh K. Wagner
ATTORNEY Patented Nov. 8, 1927.

1,648,163

UNITED STATES PATENT OFFICE.

GUSTAV G. CHILDS, OF ST. LOUIS, MISSOURI, ASSIGNOR, BY MESNE ASSIGNMENTS, TO BRECK ENGINEERING COMPANY, OF ST. LOUIS, MISSOURI, A CORPORATION OF MISSOURI.

LUBRICATOR.

Application filed April 13, 1923. Serial No. 631,782.

This invention relates to a device for forcing a light grease with air pressure into such parts of an automobile as are equipped with cups suitable for high pressure lubrication.

This device quickly and conveniently forces this lubricating grease into bearings without waste and the quantity of grease used is under control of the operator.

A further object of the present invention is the provision of a novel form of control valve, which permits the operator to manipulate this device by the movement of a single lever or trigger.

Another object is to provide an arrangement whereby the pressure is automatically released on the grease, that connecting tubing may be removed without the loss of grease.

With the foregoing and other objects in view, which will appear as the description proceeds, the invention resides in the combination and arrangement of parts hereinafter described and claimed, it being understood that changes in the precise embodiment of the invention hereinafter disclosed can be made without departing from the spirit of the invention.

In the accompanying drawings forming part of this specification, in which like numbers of reference denote like parts wherever they occur.

The figure is a central sectional view of the complete device.

An air cylinder 1 is exteriorly threaded at its upper end to fit interior thread 2 of handle 3, and exteriorly threaded at its lower end to fit interior thread 4 of a head 5 having a concentric bearing 6 through which passes a piston rod 7 having exteriorly threaded stems 8 and 9 for the reception of nuts 10 and 11 respectively. A piston 12 slides within cylinder 1, and together with washer 13 and cup leather 14 is clamped between nut 10 and shoulder 15 of piston rod 7. Washer 13, which is preferably of steel, prevents yielding of cup leather 14 except at its upturned periphery 16. Piston 12 has a groove 17 in its periphery for containing piston ring 18.

Handle 3 is substantially L-shaped and contains duct 19, which enlarges at one end into an eccentric opening 20 communicating with the upper end of cylinder 1, and at its other end passes through a stem 21 for connection to an air hose 22. Duct 19 is normally closed by a cylindrical plunger 23, which slides within a cylindrical hole 24 passing perpendicularly across duct 19. The lower end of plunger 23 has a stem 25 provided with a pin 26 pivotally meshing with a slot 27 in an arm 28 of a trigger 29 pivoted by a pin 30 in a recess 31 opening at one end to hole 24 and at its other extremity 32 into the atmosphere. A spring 33 interposed between arm 28 and an exteriorly threaded plug 34 screwed into the lower tapped end 35 of hole 24 tends to move plunger 23 against the terminus 36 of hole 24. When handle 37 of trigger 29 is pulled upwardly, plunger 23 descends against the action of the spring 33 and brings into registration with duct 19 the duct 38 extending transversely through plunger 23 near its upper extremity. This allows air to flow from air hose 22 through duct 19, duct 38, and enlarged opening 20 into cylinder 1, thereby causing the descent of piston 12. When trigger arm 37 is released, plunger 23 ascends, the confined air in cylinder 1 escaping through a port 39, which is located below the plunger 23 when said plunger 23 is in its upper position, but is closed by said plunger 23 when in its lowest position.

A cylinder 40 of approximately one-third the area of cylinder 1 is exteriorly threaded at its upper end to fit interior thread 41 of head 5 and is exteriorly threaded at its lower end to fit interior thread 42 of a cap 43 having its upper periphery 44 of hexagon shape to facilitate engagement with a wrench and having its lower end terminating in an exteriorly threaded stem 45 having an opening 46 extending therethrough and communicating with cylinder 40. A piston 47 slides within cylinder 40, and together with washer 48 and cup leather 49 is clamped between nut 11 and shoulder 50 of piston rod 7. Washer 48, which is preferably of steel, prevents yielding of cup leather 49 except at its upturned periphery 51. Piston 47 has a groove 52 for containing piston ring 53.

Cylinder 40 can be filled with grease after removal of the cap 43, which can then be replaced and a flexible metallic tubing 54 attached to the stem 45 through a coupling 55 threaded at 56 to fit the external thread of stem 45 and having a shoulder 57 for drawing up the stem 58 of tubing 54, said stem being provided with a co-operating shoulder 59 which abuts against the shoulder 57 and forms a tight joint.

Whenever air is admitted above cylinder 1, piston 12, rod 7, and piston 47 descend, forcing grease out of cylinder 40 and into tubing 54, which is coupled at its other end to the part to which it is desired to convey the grease.

Having thus described this invention, I hereby reserve the benefit of all changes in form, arrangement, order, or use of parts, as it is evident that many minor changes may be made therein without departing from the spirit of this invention or the scope of the following claims.

I claim:

A lubricating device, comprising a lubricant cylinder, a fluid cylinder of larger diameter than the lubricant cylinder, a head having detachable threaded connections with both of said cylinders and holding them in axial alignment, a rod extending for sliding movements through said head, a piston on said rod in the lubricant cylinder, another piston on said rod in the fluid cylinder, a handle member having detachable connection with the end of said fluid cylinder opposite said head and having an inlet passage opening into the fluid cylinder and an outlet passage from the fluid cylinder, a valve controlling both of said passages, means holding said valve normally in position to close the inlet passage, and an actuator extending into said outlet passage for moving said valve to close the outlet passage and to open the inlet passage.

In testimony whereof I hereunto affix my signature.

GUSTAV G. CHILDS.